United States Patent [19]

Sheehan

[11] 4,082,194
[45] Apr. 4, 1978

[54] SELF-CONTAINED PALLET-ELEVATING BAG PALLETIZER

[76] Inventor: Russell T. Sheehan, 11418 Auburndale Ave., Livonia, Mich. 48150

[21] Appl. No.: 701,136

[22] Filed: Jun. 30, 1976

[51] Int. Cl.² .................................................. B65G 57/24
[52] U.S. Cl. .................................. 214/6 P; 214/6 DK
[58] Field of Search ................ 214/6 P, 6 DK, 6 H, 214/8.5 G

[56] References Cited

U.S. PATENT DOCUMENTS

| | | | |
|---|---|---|---|
| 2,655,271 | 10/1953 | Cole et al. | 214/6 P X |
| 2,701,650 | 2/1955 | Stevenson | 214/6 P X |
| 3,324,623 | 6/1967 | Johnson et al. | 214/6 DK X |
| 3,416,674 | 12/1968 | Gualandris et al. | 214/6 DK |
| 3,612,300 | 10/1971 | Berghgracht | 214/6 P X |
| 3,730,357 | 5/1973 | Beaty et al. | 214/6 P X |
| 3,921,825 | 11/1975 | Sheehan | 214/6 P |

FOREIGN PATENT DOCUMENTS

| | | | |
|---|---|---|---|
| 1,395,649 | 3/1965 | France | 214/6 DK |
| 2,063,677 | 7/1972 | Germany | 214/6 P |

Primary Examiner—L. J. Paperner
Attorney, Agent, or Firm—Willis Bugbee

[57] ABSTRACT

A wheel-supported palletizer frame structure has an empty-pallet magazine containing an empty pallet stack from the bottom of which empty pallets are delivered one by one to a hydraulic scissors pallet elevator while the rearward ends of the pallets remaining in the stack are temporarily lifted. The pallet elevator has a table which is raised and then lowered step-by-step by a hydraulic scissors mechanism from successive elevated positions wherein the platform or each tier of bags thereon is lowered in timed relationship with a rotary and reciprocable open-ended bag positioner. Filled bags are fed one-by-one to either of the opposite ends of the bag positioner from a horizontal bag conveyor aligned with the bottom of the bag positioner and coupled thereto for travel back and forth therewith. The bag positioner is rotatable between either of two longitudinal positions aligned with the conveyor and movable into any one of a plurality of lateral positions disposed transverse to said bag conveyor. The bag positioner is also movable laterally of the bag conveyor to position the bags dropped therefrom onto different longitudinal positions parallel to the bag conveyor. The bag positioner is also mounted for motion transverse to the direction of motion of the bag conveyor to deposit the bags in different lateral positions perpendicular to the bag conveyor. The open-ended bag positioner enables individual bags to be swung horizontally to positions 90° and 270° apart in order to position the sewed end of each bag on the inside of each tier of the stack of bags on the pallet. The four-wheeled mount of the entire machine enables it to be moved bodily to any desired position upon the floor of the warehouse or other palletizing building.

2 Claims, 3 Drawing Figures

SELF-CONTAINED PALLET-ELEVATING BAG PALLETIZER

BACKGROUND OF THE INVENTION

U.S. Pat. No. 3,921,825 issued Nov. 25, 1975, to Robert T. Sheehan for Bag-Turning Stacking Palletizer discloses a palletizer in which substantially the entire machine is raised and lowered and also moved to and fro laterally of the direction of feeding the filled bags from a feed-on conveyor in order to raise the bag positioner to deposit each tier of bags, the bag positioner being likewise rotatable to position the bags of each tier according to a predetermined pattern which is varied from tier to tier in order to overlap the joints between the bags in the tier immediately below the tier of bags being laid. Typical bag arrangements for different tiers are shown in FIGS. 10 to 13 of that patent, and can be reproduced by the present palletizer. In the said Sheehan U.S. Pat. No. 3,921,825, however, the mechanism which supports and rotates the bag-positioning carriage has to be raised and lowered bodily because the pallet remains at a constant level.

In contrast, the palletizer of the present invention has a more simplified construction which enables the rotary bag-positioner to remain at a constant level while the pallet elevator is lowered from its highest position immediately beneath the gates of the bag-positioner for depositing the lowermost tier of bags step-by-step to successively lowered positions for depositing each subsequent tier until its lowermost position for depositing the uppermost tier of bags thereon is reached. The palletizer of the present invention, by thus greatly simplifying the construction, also greatly increases the speed of operation of the mechanism and reduces the amount of power required, in contrast to the much slower operation of the machine shown in U.S. Pat. No. 3,921,825 and the greater amount of power required to operate it. Moreover, the palletizer of the present invention provides an empty pallet stack in a magazine immediately adjacent the pallet elevator in the same frame structure mounted on the same ground wheels and adjacent the hydraulic pumping and valve equipment and the driving motors, and the operator controls the machine from a console at a control station on the machine so that the entire present machine moves as a unit to its different positions in contrast to the above-mentioned prior patented palletizer wherein the pallet magazine and the hydraulic and electrical equipment are mounted as separate units and no unitary movement of the entire machine is possible or practical.

SUMMARY OF THE INVENTION

The invention particularly resides in a self-contained pallet-elevating bag unitarily-movable palletizer preferably on ground wheels and carrying, within a single compact frame structure, its entire electrical, mechanical, and hydraulic operating equipment, together with the empty pallet magazine and the pallet conveyor for transferring the bottom pallet of the stack therein to the lowermost position of the pallet elevator as each succeeding pallet has been completely loaded and conveyed out of the machine for pick-up, as by a conventional forklift truck. The invention also resides in the open-ended bag-positioner which remains at a constant level while moving back and forth to and fro in that level, at the same time being rotatable through 90° to receive a filled bag at either end of the carriage, and through 270° to position the sewed end of the bag inside each tier, thereby speeding up the operation of the machine. Means is provided for centering each pallet upon the pallet elevator table. Control of the entire machine is regulated by an operator from a console positioned on the machine itself and movable with it.

GENERAL ARRANGEMENT

Figure 1:
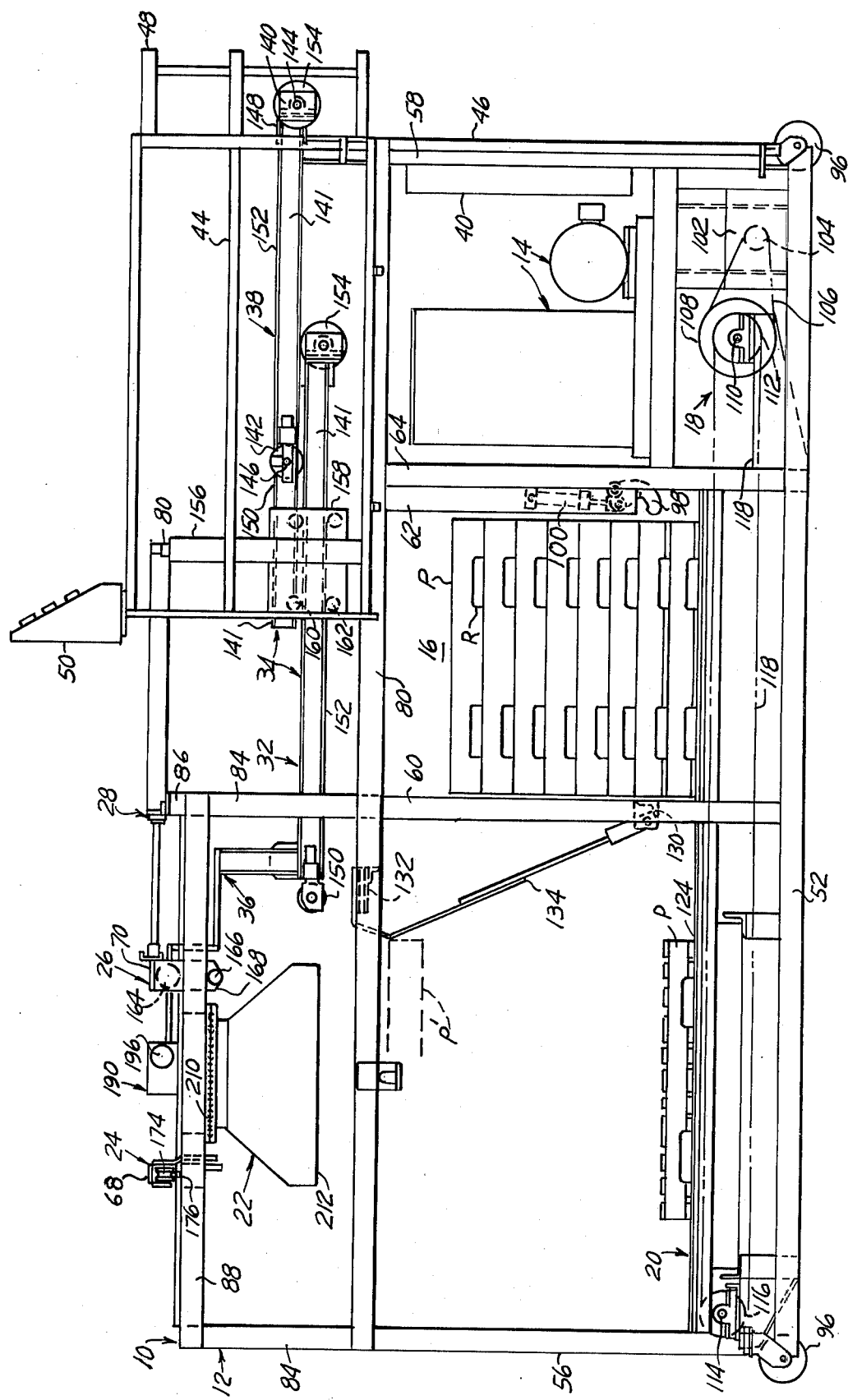
FIG. 1 is a side elevation of a self-contained pallet-elevating bag palletizer in its starting position, according to one form of the invention.
Figure 3:
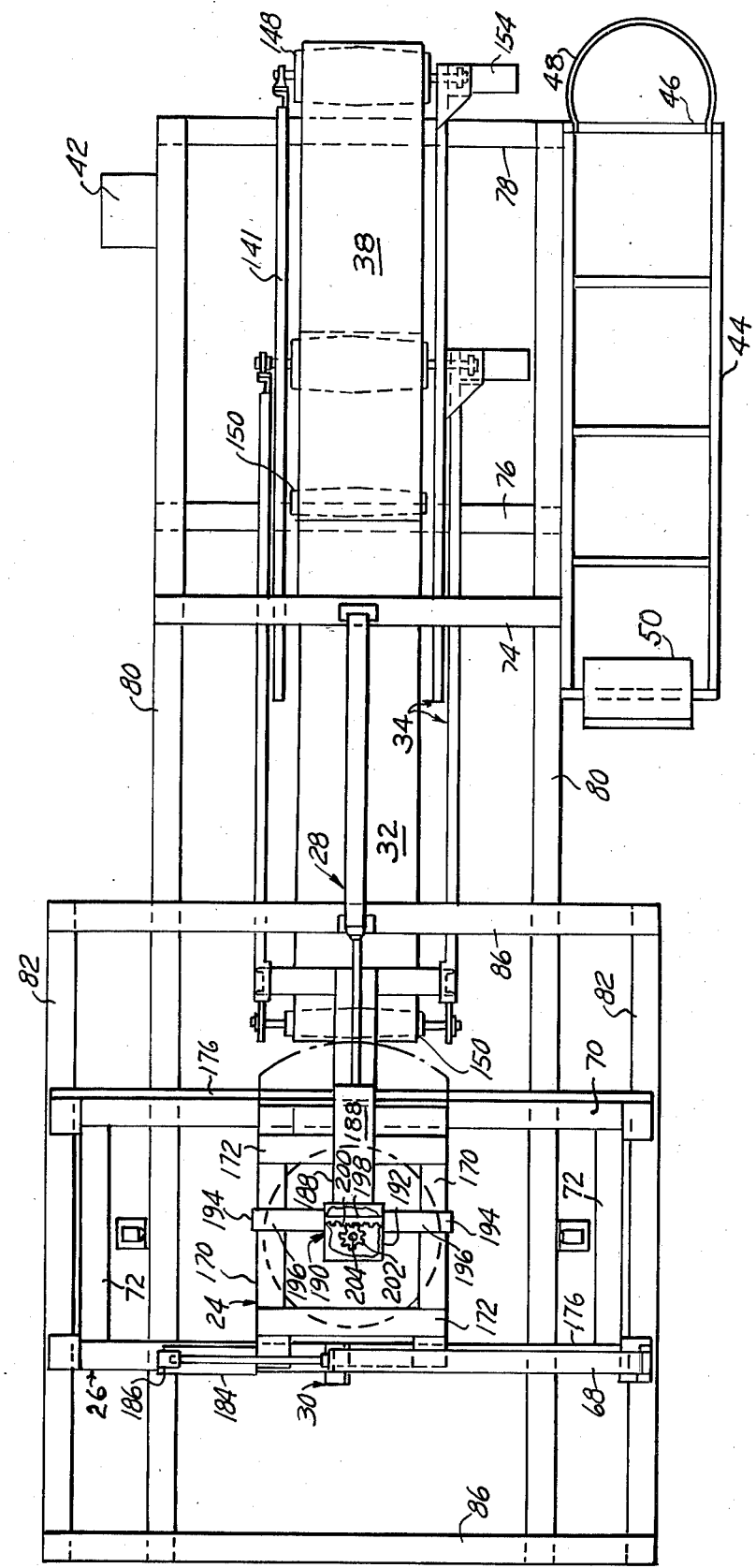
FIG. 3 is a top plan view of the palletizer shown in FIGS. 1 and 2.

Referring to the drawings in detail, FIG. 1 shows a self-contained pallet-elevating bag palletizer, generally designated 10, consisting generally of a caster-supported open-sided structure 12 which at its rearward end contains a hydraulic power unit 14. Mounted forward of this is a pallet magazine 16 containing a stack of empty pallets P which are fed by a pallet conveyor 18 onto a hydraulic scissors pallet elevator 20 at the opposite or forward end of the palletizer 10. Immediately above the pallet elevator 20 is a rotary bag positioner 22 which is mounted upon and depends from a transversely movable carriage 24. The latter in turn is supported by a longitudinally movable carriage 26 which thus indirectly supports the rotary bag positioner 22 which is moved back and forth by a longitudinal reciprocatory hydraulic motor 28. The transversely movable carriage 24 is moved to and fro by a transverse reciprocatory hydraulic motor 30 mounted on the longitudinally-movable carriage 26 (FIG. 3). The same hydraulic motor 28 which moves the longitudinally-movable carriage 26 is supported upon the upper mid-portion of the frame structure 12 and also moves longitudinally the reciprocable forward unit 32 of a telescoping duplex bag conveyor 34 connected to the longitudinally-movable carriage 26 by an upstanding coupling structure 36 (FIG. 1). The stationary rearward bag conveyor unit 38 receives the filled bags and deposits them one-by-one upon the forward bag conveyor unit 32 for further transfer to the bag-positioner 22, whence they are dropped one-at-a-time upon the pallet P on the raised scissors pallet elevator 20 to form each successive tier according to a predetermined pattern, as described more fully below in the discussion of the operation of the palletizer 10.

A solid state control panel 40 and a main power panel 42 are located respectively at the rearward end and rearward corner of the frame structure 12. A catwalk 44 reached by a ladder 46 extends along the rearward upper portion of the frame structure 12. The upper end of the ladder 46 being protected by a guard structure 48 protects the operator against falls backward from the ladder. An operating console or control station 50 is mounted upon the frame structure 12 at the forward end of the catwalk 44, whence the operator controls all motions of the palletizer 10.

FRAME STRUCTURE

Figure 2:
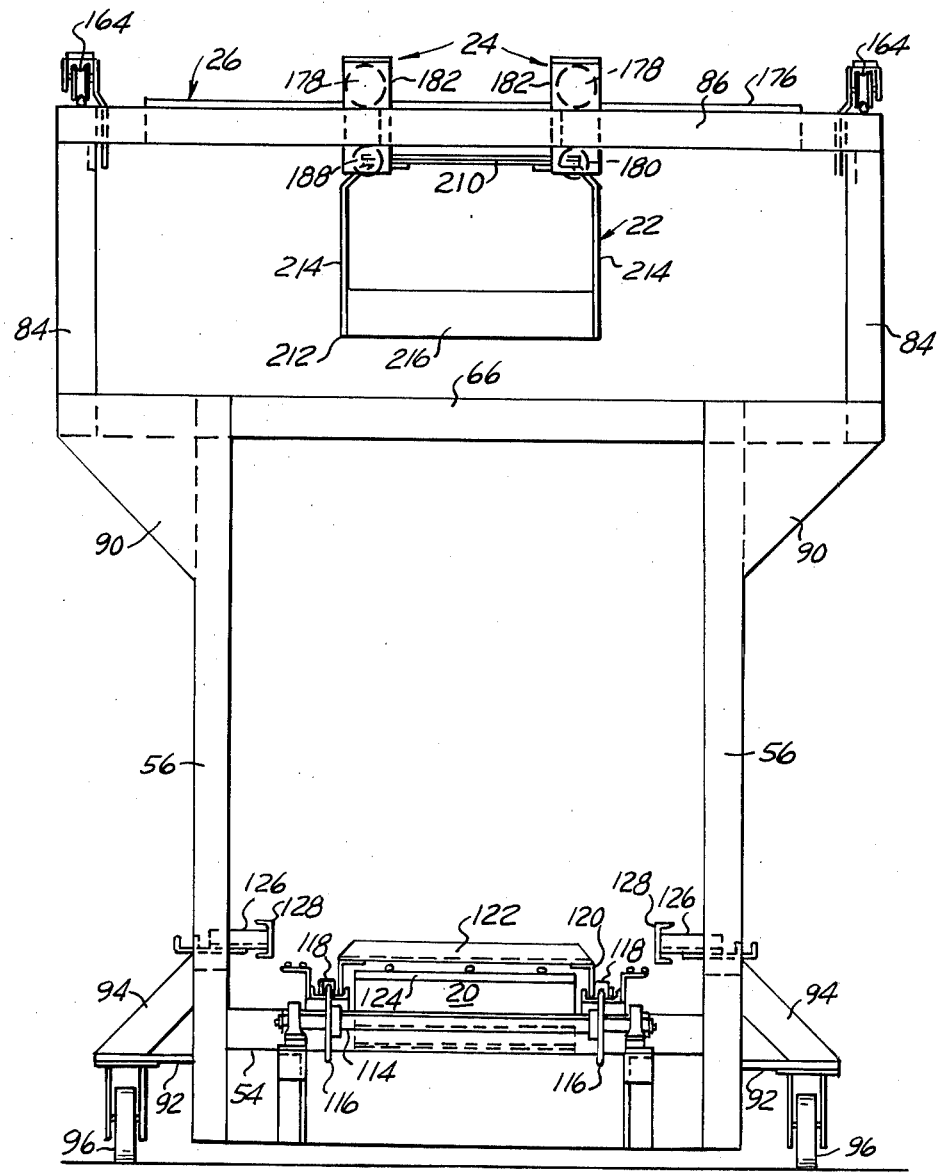
FIG. 2 is a left-hand end elevation of the palletizer shown in FIG. 1.

The frame structure 12 has bottom longitudinal and cross members 52 and 54 respectively (FIGS. 1 and 2) from which rise forward and rearward uprights 56 and 58 between which are located intermediate uprights 60, 62, 64. These are interconnected by cross members 66, 74, 76, and 78 (FIG. 3) and by intermediate longitudinal members 80 and outboard longitudinal members 82. The longitudinal carriage 26 has longitudinal members 68 and 70 and cross members 72. The upper portion of the frame structure 12 at its forward end overhangs the lower portion thereof (FIG. 2) with upper auxiliary uprights 84 resting upon and secured to the outwardly-extending opposite ends of the cross members 66 with their upper ends joined by upper cross members 86 and upper longitudinal members 88. The upper uprights 84 are joined to the lower uprights 56 by gusset plates 90 (FIG. 2). Extending outward from the lower ends of the uprights 56 and 46 (FIGS. 1 and 2) are outriggers 92 braced by inclined arms 94 and supporting ground wheels 96 by which the entire palletizer 10 with all of its operating equipment can be moved bodily from place to place as required by the conditions of use.

PALLET FEEDING AND CONVEYING CONSTRUCTION

The next to the lowermost of the stack of empty pallets P stored in the pallet magazine 16 is engaged by a pallet-tilting bellcrank hook 98 (FIG. 1) pivoted between the uprights 62 and swung inward or outward by the piston rod of a hydraulic reciprocatory pallet-tilting motor 100 pivoted at its upper end between the upright 62. The hook 98 is so positioned that it engages the upper edge of one of the cutouts extending upward from the rearward lower edges of the pallets P corresponding to the recesses R (FIG. 1) provided for forklift truck handling. The pallet conveyor 18 is driven by a motor 102 (FIG. 1) from its drive pulley 104 and belt 106 to a driven pulley 108 on the drive shaft 110 carrying a pair of laterally-spaced conveyor drive sprockets 112. The conveyor drive sprockets 112 and their drive shaft 110 are disposed in longitudinally-spaced parallel relationship with a pair of laterally-spaced conveyor driven sprockets 116 on a driven shaft 114 at the forward end of the palletizer 10. Trained around the driving and driven sprockets 110 and 114 are two laterally-spaced endless pallet conveyor sprocket chains 118, the upper courses of which extend through the lower portion of the pallet magazine 16 and through the lower forward portion of the frame structure 12 on opposite sides of the hydraulic scissors pallet elevator 20 (FIG. 2). The hydraulic scissors pallet elevator 20 is conventional and its details are beyond the scope of the present invention. Such an elevator is manufactured and sold, for example, by American Manufacturing Company, Inc., 2119 Pacific Avenue, Tacoma, Wash. 98402. The empty pallet conveyor chains 118 carry inverted L-shaped brackets 120 between which are secured transverse pallet conveyor bars 122 spaced longitudinally apart from one another at intervals slightly greater than the lengths of the pallets P along the conveyor sprocket chains 118. As a consequence, the table 124 of the pallet elevator 20 moves upward and downward between the longitudinally-spaced conveyor bars or slats 122 and between the laterally-spaced pallet conveyor chains 118 without any interference of the one with the others, as described more fully below in connection with the operation of the invention.

Mounted on the uprights 56 and extending toward one another are adjustable arms 126 (FIG. 2) carrying horizontal longitudinal pallet guide rails 128 adapted to prevent undue lateral displacement of the pallets P on the elevator table 124. Extending upward from a cross bar 130 secured at its opposite ends of the intermediate uprights 58 to a cross bar 132 secured at its opposite ends to the intermediate longitudinal members 80 is an inclined pallet centering guide 134 for centering the pallets P beneath the rotary bag-positioning depositor 22.

BAG FEEDING AND DEPOSITING MECHANISM

The bags to be palletized are deposited in any suitable manner, as by a conventional feed-on conveyor (not shown), upon the rearward end of the rearward bag conveyor unit 38 of the telescoping duplex bag conveyor 34. The rearward bag conveyor unit 38 has opposite channel side members 141 which are fixedly mounted upon the upper rearward portion of the frame structure 12 and which carry laterally-spaced aligned pairs of rearward and forward bearing blocks 140 and 142 (FIG. 1). These rotatably support the driving and driven shafts 144 and 146 respectively of driving and driven conveyor drums 148 and 150 between and around which a rearward endless conveyor belt 152 is trained, and is driven by a hydraulic rotary motor 154. The rearward and forward ends of the channel side members 141 of the rearward conveyor unit 38 are connected to and supported by the rearward frame structure uprights 46 and intermediate uprights 156, the lower ends of which are secured to and rest upon the intermediate longitudinal frame members 80. Secured to and depending from the intermediate uprights 156 are two laterally-spaced conveyor-supporting roller units 158 (FIG. 1), each consisting of spaced pairs of upper and lower guiding and supporting rollers 160 and 162, between which the forward bag conveyor unit 32 reciprocates horizontally. The forward conveyor unit 32 is similar in construction to the rearward conveyor unit 38 except that its side members 141 are not extended forward beyond the forward drum 150, hence similar parts are designated with the same reference numerals.

Rising from the forward ends of the forward conveyor unit side members 141, the upstanding coupling structure 36 of unfolded Z-shaped form is connected at its upper end to the horizontal cross member 70 of the longitudinally-movable carriage 26 which, as previously stated, is moved back and forth longitudinally by the longitudinal reciprocatory hydraulic motor 28 mounted at its opposite ends on cross members 74 and 86. The longitudinally-movable carriage 26 is guided and supported in its reciprocation by opposed pairs of upper and lower bearing rollers 164 and 166 respectively mounted on a cross head 168 secured to and depending from the cross member 70.

The transversely-movable carriage 24 is of open-centered rectangular construction (FIG. 3), the opposite longitudinal side members 170 of which are interconnected by cross members 172 and their longitudinally-projecting ends carry grooved bearing rollers 174 (FIG. 1) which travel to and fro transversely along transverse rails 176 while supported and guided by spaced pairs of upper and lower bearing rollers 178 and 180 respectively (FIG. 2) in bearing roller hangers 182 secured to the longitudinally-projecting outer ends of the longitudinal side members 170 (FIG. 3). The piston rod of the transverse reciprocatory motor 30 mounted on the longitudinally-movable carriage 26 (FIG. 3) is connected to the outer end of an extension bar 184, the inner end of which is connected to one of the longitudinal carriage members 170 of the carriage 24 while its outer end terminates in an upstanding coupling 186 to which the piston rod of the motor 30 is connected.

Mounted on the transversely-movable carriage 24 on the rearward cross member 172 thereof is a bracket 188 (FIG. 3), on the inner end of which is mounted a hydraulic rotary actuator, generally designated 190, consisting of a central housing 192, to the opposite sides of which are secured two reciprocatory hydraulic motors 194, the cylinders 196 of which contain piston heads (not shown) interconnected by a common combined piston rod and rack 198 with rack teeth 200 which mesh with a pinion 202 drivingly connected to a rotary vertical shaft 204.

The vertical shaft 204 extends downward to the bag positioner 22 through the housing 192 on the bracket 188 extending forward from the rearward cross member 172 of the transversely-movable carriage 24, through a tapered roller bearing (not shown) and through the annularly-grooved upper and lower race discs of an annular ball thrust bearing 210. The tapered roller bearing rotatably supports the weight of the rotary bag positioner 22 and its load while the multiple bearing balls moving orbitally in the opposing orbital grooves of the upper and lower race discs of the annular ball thrust bearing 210 provide smooth uninterrupted rotation, without jamming or halting, of the open-ended bag carrier 212, notwithstanding the varying positions of the bags deposited therein. The bag carrier 212 has its opposite sides 214 connected at its lower ends to a bottom double gate unit 216 similar to that shown in the above-mentioned Robert T. Sheehan U.S. Pat. No. 3,921,825 and similarly operated by hydraulic cylinder means which in one position close the gates and in another position open them to permit the bag resting thereon to fall through the opening therebetween onto the pallet P immediately below it on the table 122 of the scissors pallet elevator 20.

HYDRAULIC OPERATING CIRCUIT

In the palletizer 10 of the present invention as actually constructed, the above-described reciprocatory hydraulic motors (or "cylinders" as they are frequently designated in the hydraulic art) were interconnected by a hydraulic circuit generally similar to that described in the above-mentioned Robert T. Sheehan U.S. Pat. No. 3,921,825 and illustrated in FIGS. 8a and 8b thereof, except for the principal fact that the bag positioner 22 in the present palletizer remains at a constant level instead of being raised and lowered as in the U.S. Pat. No. 3,921,825. In contrast thereto, the hydraulic scissors pallet elevator 20 raises and lowers the pallet P and bags stacked thereon by the rotary bag positioner 22.

OPERATION

In the self-contained unitarily-movable pallet-elevating bag palletizer 10, as actually constructed, the various valves for controlling the above-mentioned hydraulic reciprocatory motors were operated by solenoids which in turn were automatically controlled in a predetermined sequence by switches actuated by a complex electrical control system. It will be evident, however, that these various solenoidally-operated control valves for the above-described reciprocatory hydraulic motors could be actuated manually by the operator in timed relationship, hence for the purpose of simplifying the explanation of the operation of the invention, such manual switch operation of the valve-operating solenoids will be assumed. Let it be assumed at the outset that a stack of empty pallets P has been placed within the pallet magazine 16 and that a particular bag pattern for filled bags is to be stacked in overlapping tiers upon a pallet P from the stack thereof in the pallet magazine 16. Let it also be assumed that the operator has started the hydraulic power unit 14 so as to provide hydraulic pressure fluid to the various hydraulic control valves (not shown) for the various reciprocatory hydraulic motors mentioned above. Let it also be assumed that the entire palletizer 10 has been moved on its ground wheels 96 to the desired palletizing location and that an electrical power connection has been established.

The hydraulic pallet-tilting reciprocatory motor 100 is now supplied with pressure fluid to withdraw its piston upward, thereby swinging the bellcrank hook 98 clockwise around its pivot, thereby causing the hook to enter and engage one of the recesses in the next to the lowermost pallet P of the pallet stack. This action lifts and tilts the pallet stack around the forward edge of the next to lowest pallet P as a fulcrum while at the same time the operation of the rotary pallet conveyor driving motor 102 causes the pallet conveyor chains 118 to move in a counterclockwise path through the lower end of the empty pallet magazine 16. Thereupon the nearest approaching pallet conveyor slat 122 engages the rearward end of the lowermost pallet P in the magazine 16 and pushes it to the left (FIG. 1) onto the table 124 of the hydraulic scissors pallet elevator 20, as shown in FIG. 1, whereupon the rotary pallet conveyor driving motor 102 is halted. The hydraulic reciprocatory motor (not shown) of the conventional hydraulic scissors elevator 20 is then supplied with hydraulic pressure fluid to cause the scissors members thereof (not shown) to move toward one another around their respective pivots and thereby raise the elevator table 124 and the empty pallet P thereon to the highest level thereof indicated by the dotted lines designated P' in FIG. 1. Meanwhile, as the scissors pallet elevator 20 raises the empty pallet P, the rearward end thereof contacts and slides upward along the pallet guide 134, moving the pallet P upward and forward to the left into the dotted line position P' in the event that it has not been properly centered upon the elevator table 124 by the pallet conveyor 18.

Meanwhile, filled bags intended to be stacked upon the pallet P have been supplied to the rearward right-hand end of the stationary bag conveyor unit 38 of the duplex bag conveyor 34 while the motors 154 of the stationary unit 28 and of the movable forward bag conveyor unit 32 thereof have been actuated in succession. This action causes the bags to be conveyed by the conveyor belt 152 over the forward end thereof, dropping them one by one upon the conveyor belt 152 of the movable forward bag conveyor unit 32. The reciprocatory hydraulic motor 28 is meanwhile actuated to cause the movable bag conveyor unit 32 to move forward toward the openended bag positioner 22, the hydraulic rotary actuator 190 of which has at the same time rotated the bag positioner 22 by means of the rack 198 and pinion 202 on the vertical shaft 204 into a position where one of its open ends is aligned with the forward end of the movable bag conveyor unit 32 so as to receive the filled bag therefrom. At this time, the hydraulically-operated gates 216 of the bag positioner 22 remain closed.

The longitudinal and transverse reciprocatory hydraulic motors 28 and 30 respectively are now operated, according to the position desired for the first bag upon the pallet P in the pattern desired for the first tier thereof. When the bag positioner 22 has arrived over that position, the gates 216 thereof are operated hydraulically to open, thereby dropping the first bag upon the empty pallet P in the fully raised location of the pallet elevator table 124 indicated by the dotted lines P' in FIG. 1. The longitudinal carriage 26 and the transverse carriage 24 are then moved to cooperate with the bag positioner gates 216 so as to drop the subsequent bags delivered thereto by the units 38 and 32 of the duplex bag conveyor 34, in cooperation with the reciprocatory hydraulic motor 196 if it becomes necessary to rotate the bag positioner 22, after it has received the second and subsequent bags, to the next positions where they are to be deposited. Thereupon the gates 216 are again opened to drop the second and subsequent bags onto the second and subsequent positions of the first tier on the pallet P, according to one of the patterns shown in FIGS. 10 to 13 inclusive of the above-mentioned Robert T. Sheehan U.S. Pat. No. 3,921,825.

When the first tier of bags has been thus deposited upon the pallet P, the scissors pallet elevator 20 is operated hydraulically to lower the table 124 to the next level for depositing the second tier of bags upon the first tier which, in the palletizer 10 as actually constructed, was controlled by a photo-electric cell circuit. The depositing of the bags upon the next tier is now carried out in the foregoing manner, but with their midportions overlapping the ends of the bags in the previously-laid first tier so as to prevent sidewise slipping of the second tier of bags relatively to the lower first tier thereof. The successive stacking of tiers of bags is then carried out in the above-described overlapping manner until the highest tier thereof is deposited upon the next-to-the-highest tier. Thereupon the pallet conveyor 18 is again operated to transfer the now loaded pallet P out of the frame structure 12 of the palletizer 10 (i.e. to the left in FIG. 1) while at the same time the empty pallet lifting motor 100 is actuated to tilt the remaining stack of pallets P while the lowermost pallet P is conveyed as before by the conveyor belt 118 to its position shown in FIG. 1 immediately beneath the rotary bag positioner 22 for the stacking of a new set of bags in multiple tiers thereof.

I claim:

1. A self-contained unitarily-movable pallet-elevating filled bag palletizer, comprising an elongated unitarily portable palletizer frame structure having an upper portion and a lower portion and self-containedly holding and supporting all of the below-named palletizer components, as follows:

a longitudinal carriage mounted for longitudinal movement on said upper portion of said frame structure, a transverse carriage mounted for transverse movement on said longitudinal carriage, a rotary bag positioner rotatably mounted upon and depending from said transverse carriage, said bag positioner having side bag entrance opening means and bottom bag discharge opening means including releasable gate means disposed across said discharge opening means, a filled bag conveyor mounted for longitudinal movement on said frame structure and having a rearward bag-receiving portion adapted to receive bags during loading thereof and having a forward portion disposed adjacent said bag positioner and adapted to deliver bags thereto when said bag positioner entrance opening means is aligned with said forward bag conveyor portion, a pallet elevator mounted on the lower portion of said frame structure beneath said bag positioner and having thereon a pallet support movable upward and downward relatively to said frame structure, a pallet magazine mounted on said frame structure in spaced relationship to said pallet elevator and adapted to hold a plurality of pallets in closely-disposed relationship to one another, a pallet conveyor mpunted on said frame structure extending from said pallet magazine to said pallet support and adapted when energized to conveyor empty pallets one-by-one from said magazine to said pallet support, power-operated means for moving said longitudinal carriage longitudinally of said frame structure, power-operated means for moving said transverse carriage transversely of said longitudinal carriage, power-operated means for rotating said bag positioner, power-operated means for actuating said bag conveyor, power-operated means for actuating said pallet conveyor, power-operated means mounted on said frame structure for actuating said pallet elevator, and power-operated means for actuating said releasable gate means, said entrance opening means of said bag positioner comprising open opposite ends thereof adapted to receive bag deliveries at either of said opposite ends from said forward bag conveyor portion in response to rotation of said bag positioner aligning either of said opposite ends with said forward bag conveyor portion.

2. A self-contained unitarily movable pallet-elevating filled bag palletizer, comprising an elongated unitarily portable palletizer frame structure having an upper portion and a lower portion and self-containedly holding and supporting all of the below-named palletizer components, as follows:

a longitudinal carriage mounted for longitudinal movement on said upper portion of said frame structure, a transverse carriage mounted for transverse movement on said longitudinal carriage, a rotary bag positioner rotatably mounted upon and depending from said transverse carriage, said bag positioner having side bag entrance opening means and bottom bag discharge opening means including releasable gate means disposed across said discharge opening means, a filled bag conveyor mounted for longitudinal movement on said frame structure and having a rearward bag-receiving portion adapted to receive bags during loading thereof and having a forward portion disposed adjacent said bag positioner and adapted to deliver bags thereto when said bag positioner entrance opening means is aligned with said forward bag conveyor portion, a pallet elevator mounted on the lower portion of said frame structure beneath said bag positioner and having thereon a pallet support movable upward and downward relatively to said frame structure, a pallet magazine mounted on said frame structure in spaced relationship to said pallet elevator and adapted to hold a plurality of pallets in closely-disposed relationship to one another, a pallet conveyor mounted on said frame structure extending from said pallet magazine to said pallet support and adapted when energized to convey empty palleys one-by-one from said magazine to said pallet support, power-operated means for moving said longitudinal carriage longitudinally of said frame structure, power-operated means for moving said transverse carriage transversely of said longitudinal carriage, power-operated means for rotating said bag positioner, power-operated means for actuating said bag conveyor, power-operated means for actuating said pallet conveyor, power-operated means mounted on said frame structure for actuating said pallet elevator, and power-operated means for actuating said releasable gate means, said filled-bag conveyor being composed of a stationary endless belt conveyor unit and a movable endless belt conveyor unit mounted beneath said stationary endless belt conveyor unit in bag-receiving overlapped relationship to said stationary endless belt conveyor, and said power-operated means for actuating said bag conveyor including fluid-pressure-operated reciprocatory piston and cylinder operatively connected to said movable belt conveyor unit.

* * * * *